Dec. 20, 1938.  R. C. GIBBS  2,141,133
SEDIMENTATION
Filed Feb. 25, 1936  7 Sheets-Sheet 1

FIG. 1

INVENTOR.
ROBERT C. GIBBS
BY Arthur Middleton
ATTORNEY.

Dec. 20, 1938.                R. C. GIBBS                2,141,133
                             SEDIMENTATION
                          Filed Feb. 25, 1936            7 Sheets-Sheet 2

INVENTOR
ROBERT C. GIBBS
BY
Arthur Middleton
ATTORNEY.

Dec. 20, 1938.  R. C. GIBBS  2,141,133
SEDIMENTATION
Filed Feb. 25, 1936   7 Sheets-Sheet 3

FIG. 4

INVENTOR.
ROBERT C. GIBBS
BY Arthur Middleton
ATTORNEY.

Dec. 20, 1938.   R. C. GIBBS   2,141,133
SEDIMENTATION
Filed Feb. 25, 1936   7 Sheets-Sheet 6

FIG. 8

INVENTOR.
ROBERT C. GIBBS

ATTORNEY.

Patented Dec. 20, 1938

2,141,133

UNITED STATES PATENT OFFICE 2,141,133

SEDIMENTATION

Robert C. Gibbs, Banstead, England, assignor to The Dorr Company, Inc., New York, N. Y., a corporation of Delaware Application February 25, 1936, Serial No. 65,632
In Great Britain March 1, 1935

5 Claims. (Cl. 210—3)

This invention relates to the treatment of liquids having solids in suspension—to wit, to the treatment of liquid-solids mixtures—for the purpose of clarifying the liquid and de-watering the solids. The invention is particularly concerned with sedimentation or solids settling and sludge thickening operations and it is especially suitable for the treatment of sewage.

It is known practice to deliver the sludge or pulp collected from mechanically cleaned clarifiers, whether of the type having rotating or reciprocating sweeping or cleaning blades or members, to another tank or vessel in which it is treated to the further operation of thickening or de-watering under the influence of moving so-called "picket fence" or equivalent mechanical, substantially vertically disposed, thickening devices which are adapted to effect a de-watering operation or sludge thickening resulting from the releasing or separating of a portion of the liquid from the solids content because of consequent upward liquid currents promoted by the movements of the picket fence elements.

In thickening treatments of this kind the sludge or pulp is treated for a period either by the batch system or by a continuous or semi-continuous operation wherein the thickening tank is kept full at all times and the fresh material is brought in either continuously or at intervals, displacing a corresponding amount of clarified liquid, while the thickened sludge is withdrawn as required.

It will be appreciated that the operation of such a thickener suffers from the disadvantage that it involves careful and regular control by a skilled operator, of the discharge of sludge so that, on the one hand, not too much sludge will be withdrawn at one time, as this would entail the removal also of some thinner sludge or even some of the liquor, while on the other hand, if too little sludge be drawn off the sludge quantity in the thickener will accumulate until there is danger of some of its flowing off with the clarified liquor.

An objection inherent in the operation of such thickeners when used for the thickening of sewage solids is that a tank containing thickening sewage sludge is exposed to the air and frequently gives rise to odor nuisance, and particularly in warm climates or in summer weather this nuisance is liable to be intolerable.

The object of the invention is to overcome the above disadvantage or objection by constructing and providing a plant, according to one aspect thereof, arranged so that therein the transfer of relatively thin sludge or pulp which has undergone sedimentation for thickening and the withdrawal of the appropriate quantity of thickened sludge or pulp can be carried out as a direct and inter-related series of operations and can be, if desired, continuously and automatically effected; and, according to another aspect such as where sewage is concerned, arranged so as to avoid nuisance by insuring that the sludge thickening process takes place under a body of liquid—to wit, under a main portion of the body of sewage undergoing sedimentation—which is entirely or relatively inoffensive, thus not only eliminating exposure of the thickened sludge, as thickened sewage sludge, to air but also maintaining the thickened sludge at a cool and relatively constant temperature, thereby lessening the risk of its becoming septic.

Mechanical flocculation or, as otherwise expressed, gentle mechanical agitation to aid or further the coagulation of coagulable solids constant within a liquid-solids mixture, is recognized as an aid to clarification or sedimentation and it has been proposed in a quiescent sedimentation tank or basin to provide mechanical "flocculators" in a zone adjoining that of sedimentation or settling zone so that the flow from the mechanical flocculating elements or paddles carries the resulting flocs directly into the quiescent settling zone.

It will be appreciated that owing to the submerged position of the thickener there is avoided exposure to air and direct climatic conditions, and it will be further noted that should discharge of thickened sludge from the sump or thickener fall behind the rate at which unthickened sludge is delivered to the thickener by the clarifier sweepers no harm can arise as this would only mean that the level of the thickening sludge would rise above the sump pit into the bottom of the clarifier. It will also be appreciated that the rate of the discharge of the thickened sludge can be readily adjusted within the required limits so that a balance is constantly maintained between the continuous outgoing thickened sludge and the continuous incoming sludge from the clarifier.

A further feature of the invention consists in the combination with a mechanical clarifier or mechanical thickening clarifier of the character above indicated, of a "flocculator" arranged to supply or drift flocs into the clarifier, the arrangement being such that flocculating action is continued and the flocs kept in suspension until they enter the clarifier vessel or zone.

According to one form the "flocculator" unit is located within the liquid or liquid-solids mixture of the clarifier itself, while according to other forms the "flocculator" unit may be considered as in effect exteriorly located in respect to the clarifier structure but so as to provide an arrangement according to which the flocs will be kept in suspension whereby they will directly pass or drift into the settling zone of the clarifier.

Certain features of the invention relate to the arrangement and combination of parts constituting the combined clarifier and thickener. Other features of the invention relate to the arrangement and combination of parts constituting the combined flocculating means, clarifier and sludge thickener.

In supplying suspended flocs from mechanical flocculating means to clarifier or sedimentation tanks having mechanical means for discharging the settled sludge, experience has shown that difficulty arises in passing the flocs from a flocculation tank into the clarifier, for example owing to the liability of the flocs in transit to settle after they pass beyond the action of the flocculation means or paddles and also owing to the breaking up of the flocs and thin constituent elements because of rough and improper handling by the mechanism interposed between the flocculation zone and the sedimentation zone, and a further aim of the present invention is to provide a process and arrangement for the feeding or supplying of liquid-solids mixture so that it will be subjected to a mechanically induced floc formation operation and also under conditions such that the resulting flocs in suspension in the mixture readily and directly pass to a zone wherein sedimentation thereof takes place and from which they are mechanically removed as sludge.

According to one aspect of the invention the settled sludge of a mechanically cleaned clarifier is displaced into a compartment or pit and therein is subjected, while under the liquor within the clarifier, to a thickening operation effective throughout the body of sludge within the pit as by a picket fence type of thickener.

The invention according to another aspect or phase thereof is directed to a clarifier having mechanical sludge raking blades or sweeping elements and provided with a sump or pit portion providing a thickening zone toward which the raking or scraper elements direct the settled sludge and wherein is provided a rotating or otherwise operating suitable thickening device preferably of the picket fence type.

The invention possesses other objects and features of advantage, some of which with the foregoing will be set forth in the following description. In the following description and in the claims, parts will be identified by specific names for convenience, but they are intended to be as generic in their application to similar parts as the art will permit. In the accompanying drawings there has been illustrated the best embodiment of the invention known to me, but such embodiment is to be regarded as typical only of many possible embodiments, and the invention is not to be limited thereto.

The novel features considered characteristic of my invention are set forth with particularity in the appended claims. The invention itself, however, both as to its organization and its method of operation, together with additional objects and advantages thereof, will best be understood from the following description of a specific embodiment when read in connection with the accompanying drawings in which:—

Fig. 2 is at a larger scale than Fig. 1;

Fig. 3 is a vertically and transversely extending sectional view taken as on the plane indicated by the broken line 3—3 of Fig. 2 looking in the direction of the arrows; Fig. 3 is at a larger scale than Fig. 2;

Fig. 5 is a vertically and longitudinally extending sectional view of the second form and is a view taken as on the planes indicated by the broken line 5—5 of Fig. 4 looking in the direction of the arrows; Fig. 5 is at a somewhat larger scale than Fig. 4;

Fig. 6 is a partial vertically and transversely extending sectional view taken as on the plane indicated by the broken line 6—6 of Fig. 5 looking in the direction of the arrows;

Fig. 8 is at a larger scale than Fig. 7;

Reference will now be made to the drawings in detail.

General to all forms

Each of the forms of apparatus as illustrated by the several figures has in common certain essential features or characteristics which will now be pointed out. Each form of apparatus has, as has already been indicated, a flocculating section 1, a sedimentation or settling section 2, and a sludge thickening section 3.

The invention primarily revolves about the unit or novel arrangement thereof according to which there is provided a sedimentation or settling section having in novel corelationship and association therewith a flocculating section and a sludge thickening section.

At the outset it is therefore deemed advisable to refer to the fact that each sedimentation unit comprises a structure that provides a sedimentation tank or basin collectively designated as 4, having a bottom or floor portion 5 and upstanding boundary walls collectively designated as 6. Within this tank there is also provided as an essential part of the sedimentation apparatus a sludge raking and transferring mechanism collectively designated as 7, sometimes referred to as a sediment collecting means that is operable within the sedimentation section or zone and functionable for impelling and transferring sedimented material such as settling flocs toward and into a sediment discharge provided at the lower portion of the sedimentation section.

The bottom or floor portion 5 previously referred to has or provides what may be termed as the main settling area or main settling section 8 and therefrom there depends a pocket portion or pit section 9. This section 9 includes a lowermost floor section 10 and a lower marginal wall 11 that extends from the main settling section or area 8 downwardly to the lowermost floor or bottom section 10. The structure provided by this pit or depending section 9 is sometimes referred to as a sump and provides therein what is frequently referred to as the sludge thickening zone 12. This space is also sometimes called the sludge thickening section, but in this connection it is to be noted that at times the expression "section" as employed herein may be viewed as designating a particular zone or area while as employed at other times it may be viewed as designating a certain structural section or arrangement of parts wherein and by which the particular operations as defined are carried out.

The main interior within the sedimentation tank 4 and designated as 13 provides what is herein designated as the sedimentation or settling zone and therein there is held the body of liquid-solids mixture during the period the latter is undergoing sedimentation. From certain points of view the sludge thickening zone 12 may be considered a zone or section that extends downwardly from and that constitutes a minor part of the settling zone 13 while from another point of view the volume within the settling zone 13 and above the general level of the main settling area 8 may be viewed as essentially providing the sedimentation or settling zone or section, and the thickening zone 12 which is below the general level of the main settling area 8 may be viewed as a sludge thickening zone which is at all times completely submerged by the main body of liquid undergoing sedimentation or settling in the zone 13.

The main settling area 8 is sometimes referred to as the upper main settling area in order to supply therefor a readily identifiable name. Likewise it is also here pointed out that from certain points of view the lowermost floor section 10 might be referred to as a lower settling area or thickened sludge receiving area particularly in view of the fact that the thicker portion of the thickened sludge tends to settle or gravitate upon or toward this lowermost floor section 10.

Reference has heretofore been made to the sludge raking and transferring mechanism collectively designated as 7. This comprises a suitable movable rake carrying construction 14 and a motor and suitable speed reducing and power transmission means collectively designated as 15 for imparting requisite movement to the rake carrying construction. The rake carrying construction has members collectively designated as 16 from which there depends and by which there is carried sludge raking and conveying blades 17. These blades 17 are sometimes referred to as sludge rakes and because of the inclination thereof with respect to their paths of travel they effect a plowing and impelling action on the settled solids, namely upon the sludge which has become settled or deposited upon or in the immediate region of the main settling area 8. Because of the inclination relative to their paths of travel they collectively serve to effect a scraping or raking and an ultimate collecting and transferring of the deposited solids or settled sludge from said main settling area or from the regions thereof toward the sludge thickening zone 12, or as otherwise expressed ultimately to a portion at and from which the thus raked and transferred solids pass or gravitate to and into the sludge thickening zone 12.

Figure 1:
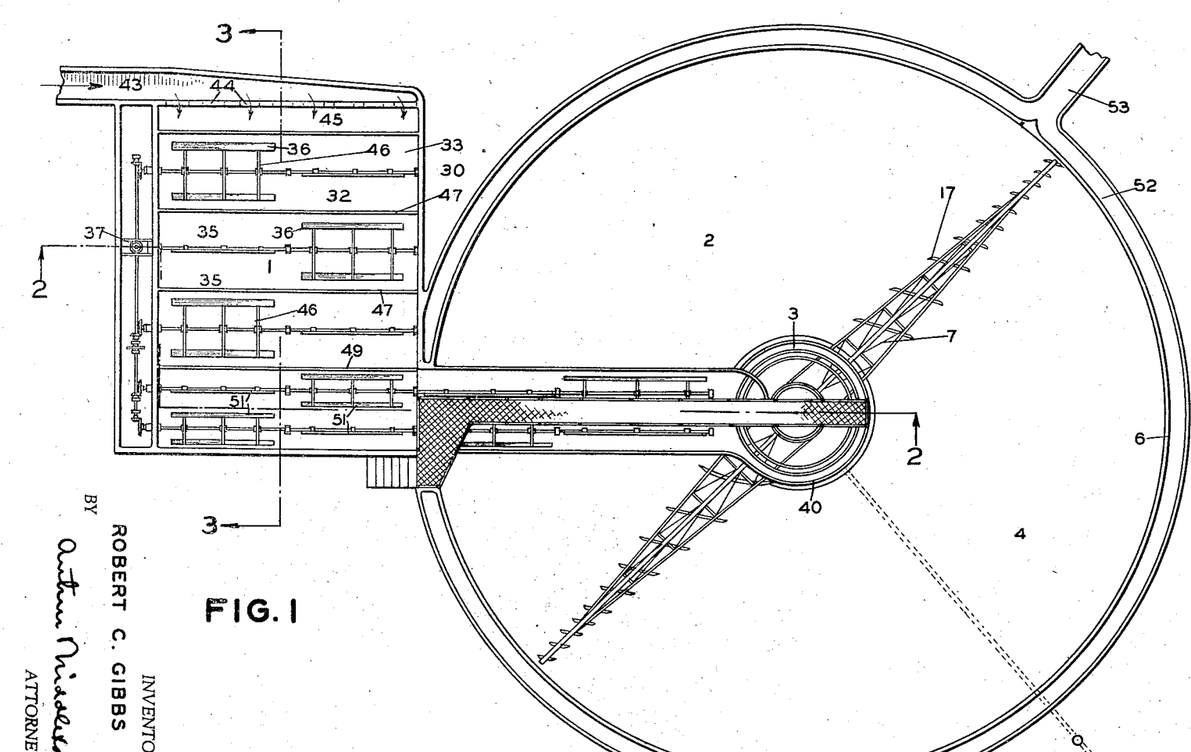
Fig. 1 is a plan view of one form of apparatus for realizing the invention, herein identified as the first form of apparatus, and this form embodies a flocculating section, a sedimentation or settling section and a sludge thickening section.
Figure 2:
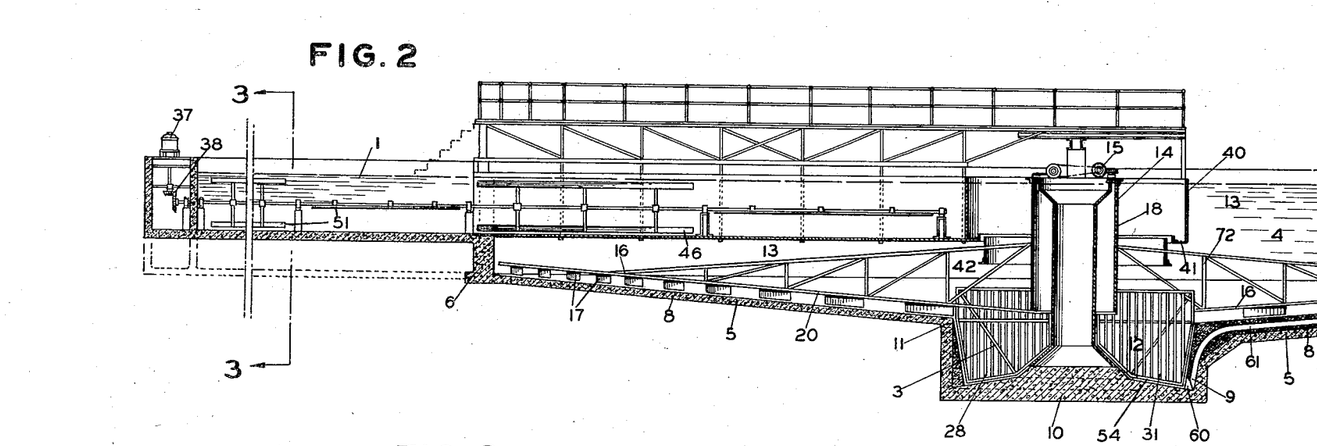
Fig. 2 is a vertically and longitudinally extending sectional view of said first form and is a partial view taken as on the planes indicated by the broken line 2—2 of Fig. 1 looking in the direction of the arrows.
Figure 3:
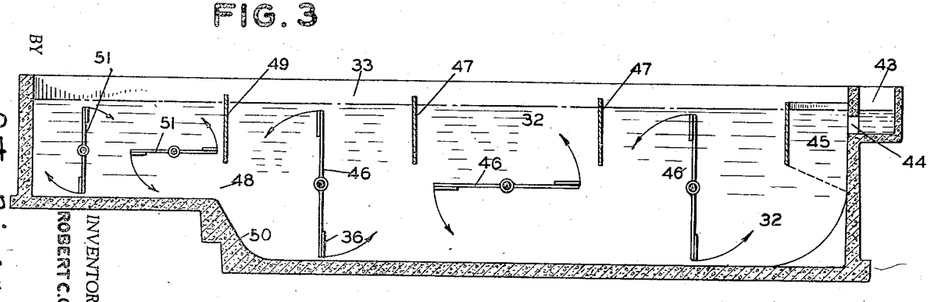
Figure 4:
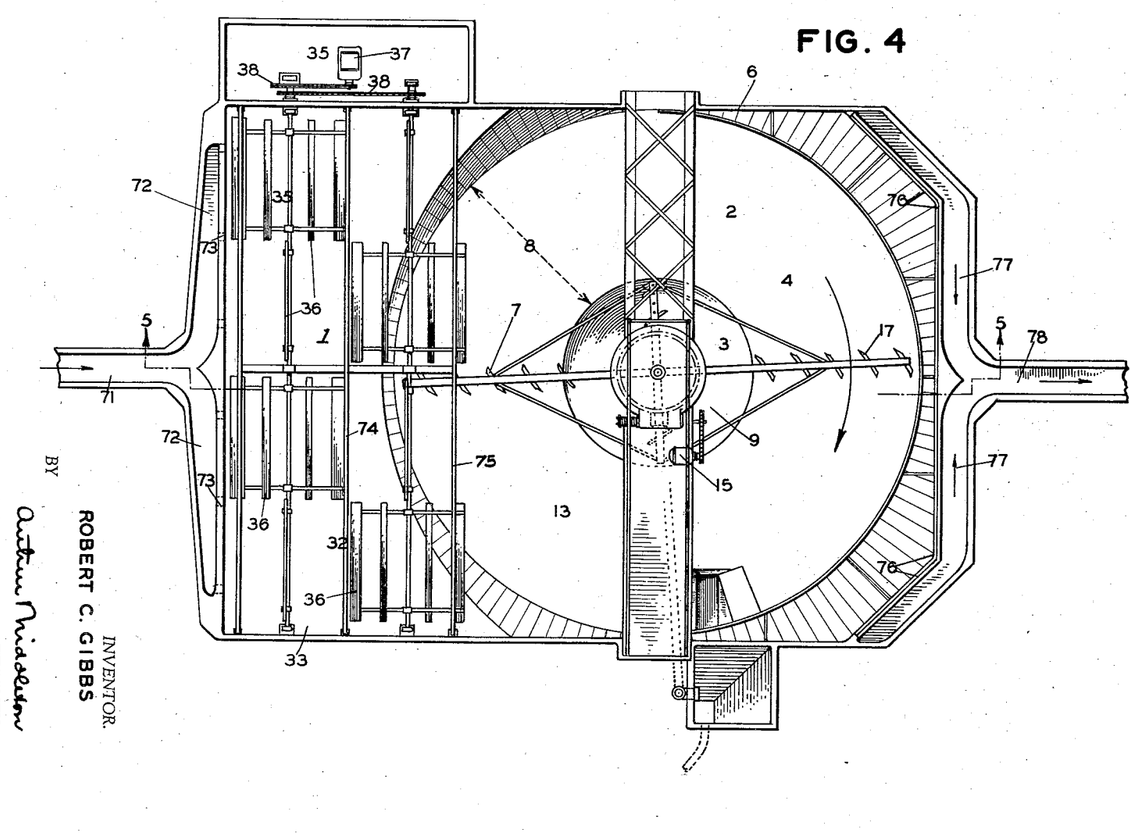
Fig. 4 is a plan view of another form of apparatus for realizing the invention, herein identified as the second form of apparatus, and this form also embodies a flocculating section, a sedimentation or settling section and a sludge thickening section.
Figures 5, 6:
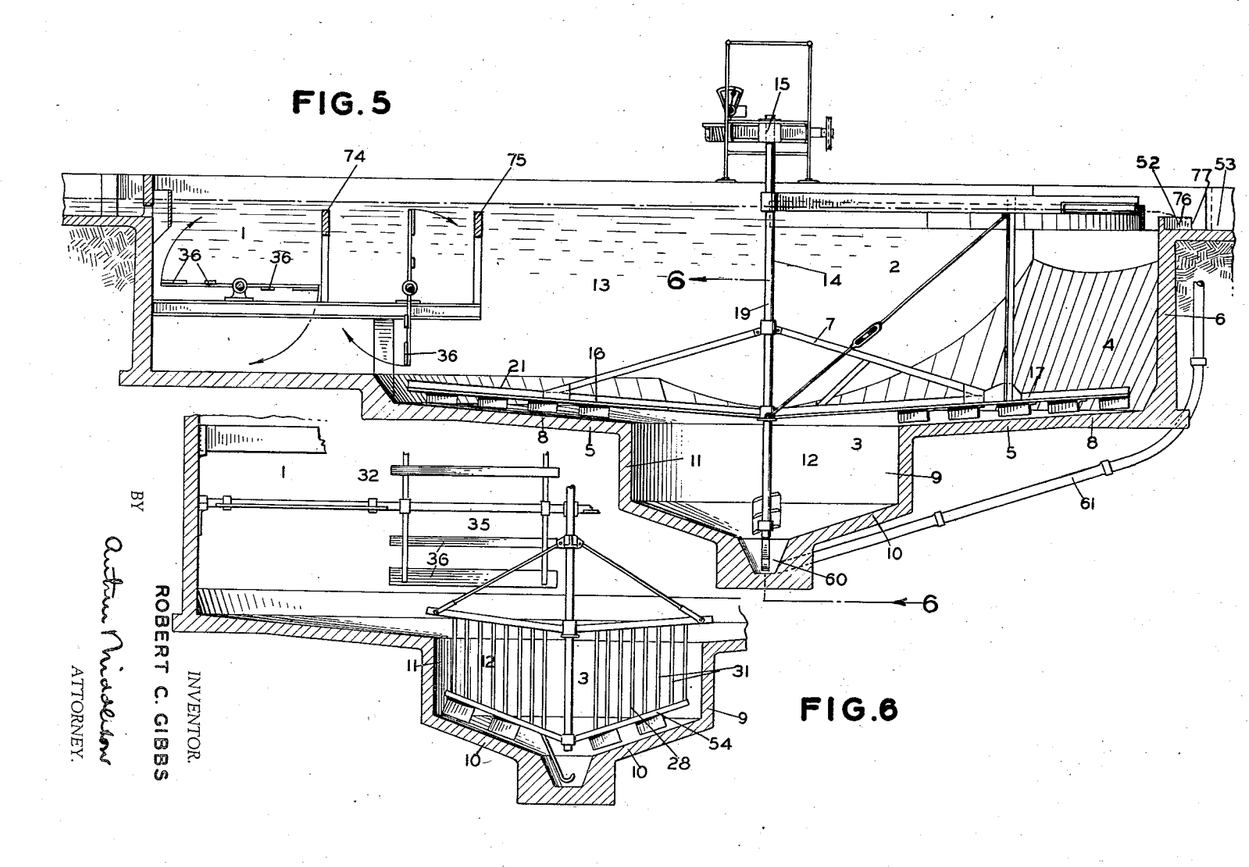

In certain forms of apparatus as illustrated, to wit, in the first form as illustrated in Fig. 1 to Fig. 3 and in the second form as illustrated in Fig. 4 to Fig. 6 the rake carrying member 16 comprises a main vertically extending member, to wit, the depending drum or cage 18 of Fig. 2 or the shaft 19 of Fig. 5, each of which rotates about a vertically extending axis. Each of these vertically extending rotatable members 18 or 19 as the case may be, carries outwardly extending or radiating rake carrying arms, to wit, arms 20 of Fig. 2, or arms 21 of Fig. 5 that essentially constitute parts of the rake carrying members 16. From these arms 20 or 21 as the case may be, there depend and are carried the raking blades 17 that are inclined to their paths of travel and that collectively constitute the sludge raking and conveying elements of the sludge raking and transferring mechanism and collectively function incident to the rotating of the carrying members therefore to effect a gradual impelling of the settled sludge inwardly toward the axis of rotation or as otherwise expressed, toward and into the thickening zone 12.

Figure 8:
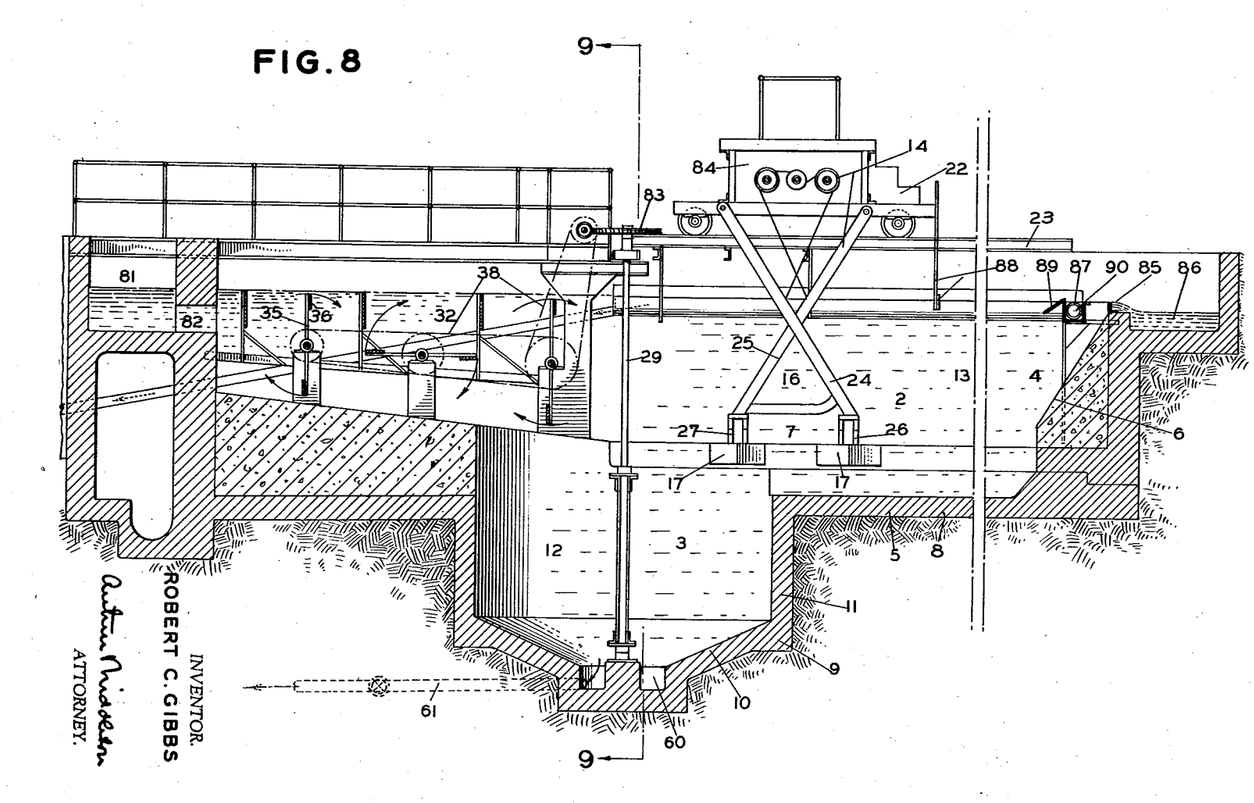
Fig. 8 is a vertically and longitudinally extending sectional view, partially broken away, of the third form of apparatus and is a view taken as on the plane indicated by the broken line 8—8 of Fig. 7 looking in the direction of the arrows.

In the third form of apparatus illustrated, the rake carrying construction has a rectilinear movement—in this connection see the third form illustrated as by Fig. 8. In this third arrangement a longitudinally reciprocating carriage 22 which is movable upon and along tracks 23 carries sets of swingable liftable arms 24 and 25 at the lower swinging extremity of each of which set of arms there is supported a rake carrying member as 26 or 27 from which there depend and by which there are directly carried the raking blades 17 heretofore referred to. For this third form of apparatus the members 24, 25, 26 and 27 essentially constitute parts of the rake carrying mechanism heretofore collectively designated 16. The longitudinal reciprocation of this carriage and of the rake elements 17 which are in effect carried thereby can be relied upon for effecting a scraping, collecting, and ultimate transference of settled sludge from the main settling area of the sedimentation section towards and into the sludge thickening zone or section 12 thereof. This transference of settled sludge is enabled to be realized because the raking elements 17 have general inclinations relative to their paths of travel.

In each form of apparatus illustrated a picket fence type of thickening mechanism is operatively positioned in the sludge thickening zone 12. This picket fence type of thickener is generally designated for the several forms by 28 and this even though the several thickening mechanisms may be somewhat different in construction. This picket fence thickener has associated therewith as a part thereof a rotatable type of solids raking and transferring mechanism such as is illustrated in connection with the first and the second form. In both of the first and second forms it is feasible to employ the rotatable vertically extending main rake carrying member or element thereof—to wit, member 18 of Fig. 2 or member 19 of Fig. 5—as a member for supporting and carrying the picket fence thickener construction. In the arrangement of the third form wherein the raking and conveying mechanism has a reciprocating longitudinal movement it becomes necessary where the rotatable picket fence type thickener is used in the thickening zone to employ an independent rotatable vertically extending carrying element such as a vertically extending shaft 29 as a means for supporting and operating the picket fence type thickener.

For each form thereof the picket fence type of thickener has been illustrated because that is considered the preferred form of structure for this purpose since the vertically extending members or picket slats 30 thereof—to wit, the relatively closely arranged but spaced mechanical thickening elements—can be readily assembled in a relatively close horizontally spaced relationship and throughout the entire area extending from the shaft to the marginal walls of the thickening zone with the result that as the thickener construction rotates it operates upon or substantially effects a thickening action upon or as to each and all sections of the sludge within the thickening zone 12. Moreover, these vertically extending picket members, slats or rods 30, incident to their rotary movement about a vertically extending axis in effect leave behind them vertically extending passageways or zones that readily permit the escape of rising gas bubbles or rising currents of liquids and they also function in a manner whereby the solids can more readily settle and whereby there is effected the desired thickening operation.

It is to be pointed out, however, in a relatively quiescent mass such as thick sludge which exists in the thickening zone 12 that with but a slight but gentle agitative effect in and throughout that entire body there can be accomplished by the spaced but relatively closely arranged sludge thickening members a sufficient but slightly localized and progressive disturbance which will lead to a ready settling of the solids and a consequent rising of the liquid of the sludge mass with the result that a certain thickening will be accomplished. While the other form of thickener may be employed in effecting a sludge thickening action, nevertheless as indicated it is considered that the picket fence type of thickener is the form preferred for accomplishing the best results.

Each of the pocket portions or pit sections 9 that provide the sludge thickening zones 12, is also provided with a small sump or thickened sludge receiving portion 60 into which the thickened sludge is progressively received as the picket fence thickener construction operates and from which the thickened sludge is withdrawn through the sludge withdrawing pipe or conduit 61. The small sump or thickening sludge receiving portion 60 constitutes a feature of a sediment discharge leading from a lower portion of the sedimentation zone, and the sludge withdrawal pipe or conduit may be viewed as an essential element of what may be referred to as a sediment discharge or of what is sometimes designated as a sediment discharge means.

As for the flocculating section 1 of each form of apparatus, this is provided by a structure which defines a flocculating zone or space 32 and the structure just mentioned essentially provides a flocculation or flocculating trough, conduit or bay 33 within which the flocculating zone or space 32 is provided and delivers directly into the settling zone 13 of the settling section 2. The structure collectively designating or defining this flocculating zone or trough has in conjunction therewith an operatively positioned series of mechanical agitators 35 that extend into the liquid-solids mixture normally flowing through the flocculating zone or trough. Said agitators 35 have mechanical agitating elements as 36 thereof which when functioning effect a gentle type of agitation in and throughout the liquid-solids mixture of a character to further and aid flocculation.

These agitators are operated in any suitable manner as by the motors 37 through suitable speed reducing and power transmission mechanism collectively designated as 38.

The mechanical agitators perform a gentle agitation which may be viewed as of a character to effect the coagulation, the coagmentation, the agglomeration, the adhesion, and the cohesion, as the case may be, of like or unlike particles or substances so as to further or accomplish a desired resulting floc formation which in certain instances may be viewed as a relatively simple product and in other instances as a product which may be termed a complex, and which for example may include a coagulated nucleus upon which minute solid particles have become attached. These mechanical agitating elements also operate in a manner to maintain the flocs against depositing within the flocculating zone. The flocculating sections function promptly to deliver the liquid-solids mixture operated thereupon—to wit, as a flocculated liquid-solids mixture—directly to and into the settling zone 13, namely forthwith upon the completion of the flocculating operation.

According to the functioning of each arrangement or form herein illustrated there is a drifting or floating of flocculated particles from the flocculating zone directly into the settling zone without any substantial mechanical disturbance of a character to disintegrate or break up the floc formation. Of course, there is contemplated in apparatus of this type the treatment of the incoming liquid-solids mixture in a manner so that it will be responsive to the flocculating operation if preliminary treatment as by chemical dosing or aeration is required or beneficial. Such primary treatment may be effected by a chemical dosing with material such as lime, and in that instance it is preferable that the chemical be intimately mixed and intermingled with and throughout the incoming liquid-solids mixture immediately preparatory to the employment of the gentle agitation which is essential for the furthering of the flocculating operations. It has heretofore been pointed out that raw sewage or other types of liquid-solids mixture can be treated in and by apparatus of the type herein illustrated.

The different forms of flocculating apparatus herein illustrated essentially employ a means for producing a thorough mixing of the incoming liquid to be treated with a chemical dosing or coagulating agent introduced therein. This mixing means is realized as by a "Turbo mixer", or other high-speed rotary type of mechanical diffuser or disperser functioning in the feed line leading to the flocculating zone 1, or as by a series of baffles past or over which the dosed incoming liquid flows, and arranged for causing intimate mixing of the chemical or coagulating agent throughout the incoming liquid introduction into the flocculating zone.

The different forms of flocculating apparatus illustrated employ or include pre-mixing means, such as above referred to, and may be considered as embodying essential features of a construction illustrated and described in and by the Smith U. S. Patent 1,893,451, or the corresponding British Patent 407,807.

Bearing in mind that the foregoing description is of a general type applicable to the several features illustrated, it is now in order to take up for further detailed consideration each of the several forms.

*Form of Fig. 1 to Fig. 3 inclusive (first form)*

According to the arrangement of this form it is to be noted that the flocculating section is in effect provided by a structure the major portion of which in the form of a trough or tray exteriorly located in reference to the structure that essentially defines the sedimentation tank or basin and that a minor portion or delivery trough or conduit of the flocculating means extends to and discharges tangentially within a stationary ring-shaped delivery member 40 having at the lower defines thereof an inwardly extending flange or apertured bottom 41. The rotatable carrying structure of the sludge raking and transferring mechanism carries what is herein identified as the rotatable inner feed ring 42 which extends into the apertured portion of the bottom or flange 41 and which is relied upon for initially directing downwardly, along a path centrally disposed in respect to the sedimentation zone, the flocculated liquid-solids mixture which passes therethrough from the ring-shaped member 40.

In the arrangement of these Figs. 1 to 3, the incoming liquid-solids mixture—such as sewage that has been subjected to a chemical dosing in a manner to effect an intimate mixing of the dosing chemical—enters along the pathway 43 thence flowing through the openings 44 into what may be termed an open bottom directing or distributing trough 45. From this directing trough the dosed liquid-solids mixture is passed into the flocculating zone 32 wherein it is subjected to a gentle agitative effect of a character to aid flocculation, to wit, an agitative effect that is realized by the slow turning movement of the paddle construction of the agitators 35 which are actuated from the motor 37 through the medium of shafting and gearing that constitute the speed reducing and power transmission mechanism 38 heretofore referred to.

The major portion of the flocculating operation is effected while the liquid-solids mixture is under the direct agitative influence of the larger flocculating paddle construction 46—46—46 of Fig. 3 between which there is disposed the partial partitions or baffles 47—47. The liquid undergoing treatment ultimately passes through the opening 48 left between the partial partition or baffle 49 and the bottom portion 50 of the flocculating trough to the smaller section of the flocculating section which is served by the smaller set of flocculating paddles 51—51 with the result that the incoming liquid-solids mixture undergoing flocculation is continuously subjected to a quiescent gentle agitative influence in a manner that precludes any settling of the formed flocs, with the further result that flocs can float or drift while remaining in suspension in the liquid into and from the centrally disposed discharge ring and in effect directly to and into the sedimentation zone. From the time the flocculating operation is initiated up to the time of delivery of a solids mixture into the settling zone there is avoided any violent agitation or sudden turns of a character which will substantially or materially destroy or break up the floc formation. The flocculated liquid-solids mixture as thus delivered into the sedimentation or settling zone 13 is detained therein under relatively quiescent conditions and for a substantial period or length of time during which the desired settling of the solids content in the liquid is substantially effected with the result that a sludge or pulp settles or lodges upon the main solids settling area 8 heretofore referred to. The apparatus of these figures has the sludge raking and transferring mechanism that operates over this settling area; said mechanism is provided by the centrally disposed rotatable carrying element in the form of a depending drum 18 that in turn carries and moves the rake carrying arms 20 about the vertically extending axis thereof whereby incident to the movement thereof the settled sludge is raked from the main settling area 8 toward and into the thickening section or pit 3. In this connection it is to be noted from an inspection of Figs. 1 to 3 that the picket fence type of thickener is carried by and is rotatable with the structure which includes the rotatable carrying element in the form of a depending drum 18 and the rake carrying arms 20 whereby the picket fence thickener construction 31 and the rake carrying arms 20 always move together and operate in closed circular paths about the vertically extending axis common to both.

An inspection of Fig. 2 and also that which has been heretofore pointed out will make it clear that the delivery section of the "flocculator" is cooperatively related with the rotatable ring 42 which is supported on and by the rotatable structure just referred to and that this rotatable ring serves to initially direct the incoming mixture downwardly toward and immediately over the thickening zone. It will thus be manifest that some of the settling material—quite a considerable amount thereof—in effect can drop or gravitate directly to and into the thickening zone while the rest of the liquid-solids mixture can move along radial paths whereby gradual settling can take place with the result that by the time the tank boundaries are reached the relatively clarified supernatant liquid can pass as effluent from the tank structure by overflowing to and into the peripheral launder construction 52 provided for receiving the clarified effluent and ultimately from the tank through the outflow pipe or conduit 53. Furthermore, as to the picket fence construction of the sludge thickeners of this form, there are provided raking elements 54 for raking and transferring the settled thickened sludge from the settling surface within the pocket portion or pit section 9 to the receiving sump 60 therefor preparatory to the thickened sludge withdrawal through pipe 61.

*Form of Fig. 4 to Fig. 6 inclusive (second form)*

According to the arrangement of these figures the incoming liquid-solids mixture to be treated enters along the trough or conduit 71 and flows through the laterally extending portions 72—72 thereof through distributing openings 73. Assuming that the incoming mixture has been preliminarily treated as by chemical dosing as heretofore mentioned it now comes under the gentle agitative influence of the mechanical agitators 35 which are operated from the motor 37 through the means or suitable speed reducing and power transmission means 38, to wit, through the sprocket and chain construction illustrated.

The liquid-solids mixture which is subjected to the agitative effect of the paddles or mechanical agitating elements 36 of the agitator 35 passes directly from the agitative influence of the paddles to and into the sedimentation zone 13 as is manifest from an inspection of Fig. 5. In this connection it is to be noted that transversely extending baffle members 74 and 75 are provided which prevent a direct blow from the openings 73—73 to and into the settling zone 13. An inspection of figures under discussion also shows that the flocculating area or zone has a width substantially equal to that of the settling tank or zone, that the flocculating means delivers the flocculating liquid-solids mixture into what may be considered as one end of the settling zone, and that the settling tank is provided with an outflow weir 76 over which clarified supernatant liquid flows as effluent to and into the effluent launder or trough 77 from which the effluent passes from the apparatus through the outflow pipe, trough or conduit 78. An inspection of these figures will make it clear that the structure that provides the sedimentation basin—or sedimentation zone of the latter—may be also viewed as providing therein the flocculation zone. According to the arrangement of this figure the solids raking and transferring mechanism and the picket fence type of sludge thickening construction include or are carried by the same shaft and necessarily simultaneously rotate, thus functioning substantially after the order of the similarly functioning parts described in connection with the arrangement of the first form. In Fig. 5 the small cavital or sump portion 60 is shown as being centrally located in respect to the floor of the pocket portion or depending section 9 and the sludge is withdrawn through the sludge offtake pipe 61.

Figure 7:
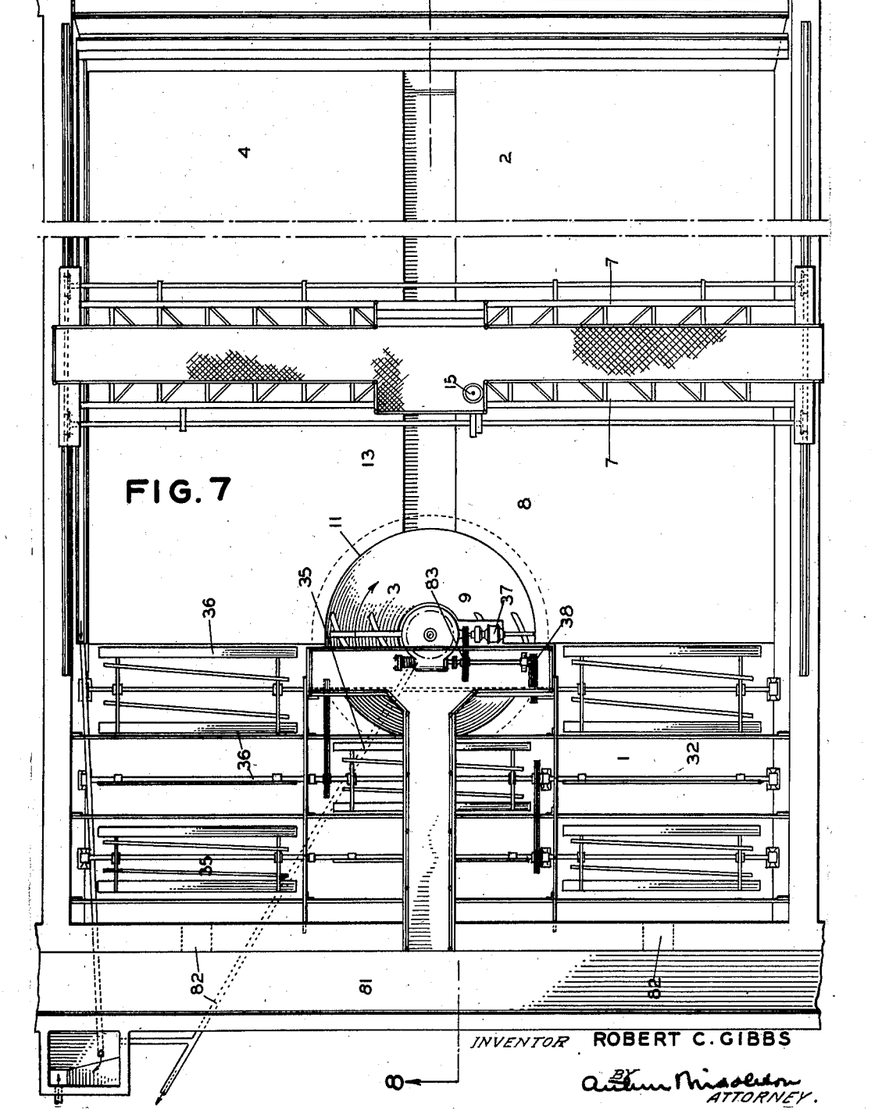
Fig. 7 is a plan view partially broken away of another form of apparatus for realizing the invention, herein identified as a third form of apparatus, and this form also embodies a flocculating section, a sedimentation or settling section and a sludge thickening section.
Figure 9:
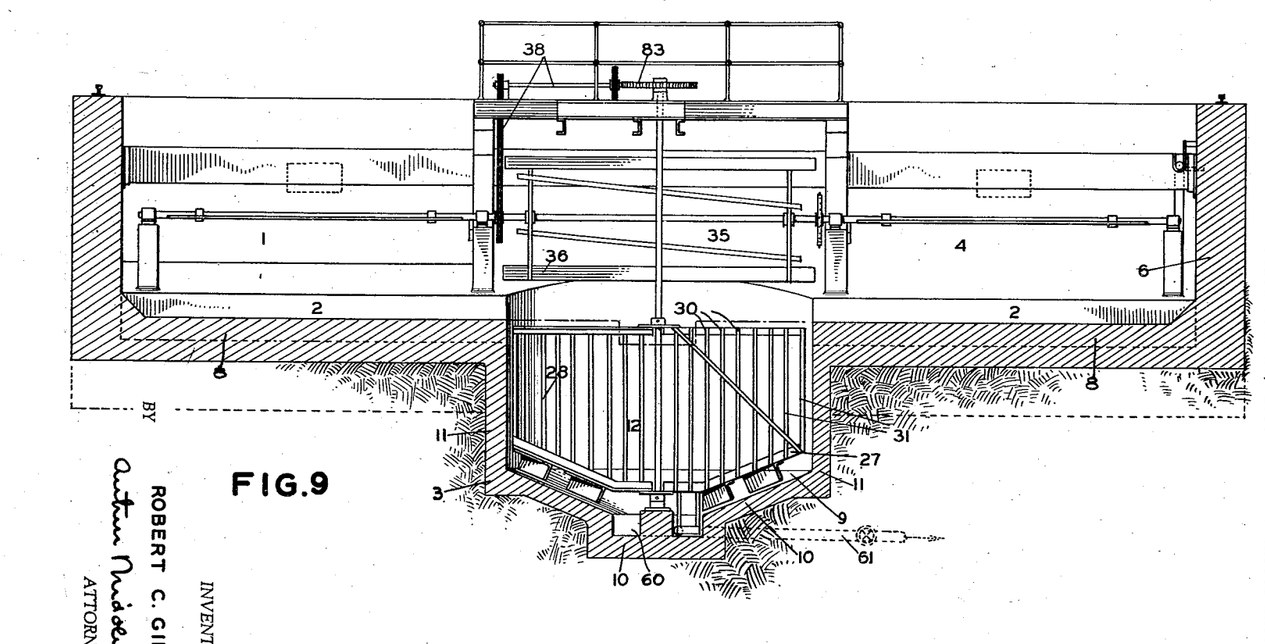
Fig. 9 is a vertically and transversely extending sectional view taken as on the plane indicated by the broken line 9—9 of Fig. 8 looking in the direction of the arrows.

*Form of Fig. 7 to Fig. 9 inclusive (third form)*

According to this third arrangement the structure that defines the settling zone or sedimentation section also defines the flocculation zone or section. In this third form the incoming liquid-solids mixture enters through the conduit 81 and passes through the distributing openings 82 into the flocculating zone or space wherein there is operatively employed the several sets of rotating paddles or mechanical agitating elements of the agitators 35. These paddles incident to this movement impart a quiescent gentle agitative effect to and upon the liquid-solids mixture passing through the flocculating zone served thereby.

These paddles are driven from the motor 37 as has been previously described, and this same motor through suitable speed reducing and power transmission gearing 83 is relied upon for effecting a turning of the vertically extending shaft 29 and thereby the picket fence type of sludge thickener. In other words, according to the arrangement of this third form, the flocculator paddles and the picket fence type of thickener construction can be simultaneously operated by and from the same motivating mechanism. It will be also noted according to the arrangement of this figure that the flocculating liquid is delivered into the region immediately above the sludge thickening section or in the locality adjacent thereto.

Mention has been heretofore made of the fact that the sludge raking and transferring mechanism of this form is of a longitudinally reciprocating type. This construction as heretofore indicated includes sets of sludge raking and conveying mechanisms which collectively function to effect a transfer of settled sludge laterally and longitudinally until it is ultimately delivered to and into the sludge thickening section. As shown, these rakes are arranged in two sets one of which is elevated to an inoperative non-raking position when the carrier truck 84 therefor moves in one direction along the tracks 23, and the other of which is likewise elevated when the carrier truck moves in an opposite direction, or, as otherwise expressed, when the carrier truck 84 moves in one direction the mechanism is such that one of the sets of rakes occupies a lower operating or sludge raking and transferring position, and when the carrier moves in the opposite direction the other of the sets of rakes occupies a lower operative position.

The flocculating means or section described may be viewed as located at one end of the apparatus and as delivering the flocculating liquid-solids mixture into one end of the settling zone. The sedimentation apparatus is also provided at the opposite section or end with a transversely extending weir 85 past which clarified supernatant liquid flows toward and into an effluent launder 86 leading from the apparatus.

In the treating of sewage there is frequently experienced a rising and accumulation of scum particles, and in order to take care of the resulting floating scum there is provided a scum launder 87 into which the scum can be pushed as for example by the scum scraping bar 88 indicated in Fig. 8. As this scum scraping bar is moved longitudinally toward the launder 87 it pushes the scum toward the launder and ultimately over the upwardly inclined guide or way 89 to and into the scum launder from which the scum can pass to and through scum offtake 89.

*General*

From the foregoing it will be manifest in carrying out the invention that incoming liquid to be treated is essentially preliminarily treated or dosed whereby floc formation or floc nuclei are initiated; that this pretreated liquid next comes under the positive agitative effects of the mechanically actuated paddles; that the flocculative material has a relatively free unobstructed passageway to and into the sedimentation zone or section; that the pathway or floc path between the flocculation section and the sedimentation section is such that the formed floc can float from the former into the latter without experiencing any harmful destructive agitative effects; that the sludge resulting from the sedimentation is raked and passed to and into a thickening zone; that in the thickening zone the sludge is subjected to a gentle agitative effect conducive to the thickening of the sludge and all of this while the sludge is under a portion of the body of sedimenting liquid; and that the entire series of step or operation is that supernatant liquid is withdrawn from the sedimentation zone as relatively clarified effluent along one path and that thickened sludge is withdrawn from a lower portion of the sedimentation and thickening sections along another path.

The flocculating apparatus can be embodied in various forms and modes and still respond to the general requirements of the apparatus as a whole. The sedimentation sections can be embodied in various forms and arrangements in respect to the flocculating section and still realize features herein disclosed. Different types and various forms of sludge raking mechanisms can be employed as is manifest from the disclosures hereof. Various forms of sludge thickening mechanism can be employed to accomplish the desired end. The picket fence type of sludge thickener is the preferred type. However, instead of operating the picket fence construction by turning it about a vertically extending axis the desired function thereof might be obtained by imparting thereto a slow rectilinear movement as for example when employed in a rectangular type of sludge thickening section.

The claims set forth and define novel relationships and features that typify the invention hereof.

Having now particularly described and ascertained the nature of my said invention and in what manner the same is to perform, I declare that what I claim is:—

1. In the clarifying of liquids having solids in suspension therein, the method which comprises subjecting a main body of such liquid to sedimentation in a main sedimentation basin, collecting the resulting settlings as sludge and mechanically impelling the same substantially horizontally while in submergence to a downwardly extending thickening section of smaller horizontal area than the main basin and in open communication therewith, subjecting the sludge in the thickening section to gentle movement to disturb the equilibrium thereof and in a manner to form vertically extending channels in the sludge of lessened resistance to liquid flow by virtue of which liquid is induced to escape from the sludge and move upwardly along an open path into the main body of liquid being clarified whereby there is effected a thickening and concentrating of the sludge in the depressed section.

2. Apparatus for clarifying liquids having solids in suspension therein comprising a settling basin for a main body of liquid to be clarified equipped with a substantially horizontally extending main bottom, sides, an influent inlet, a supernatant liquid effluent overflow and outlet, a settlings discharge, and a depressed section extending below the main bottom; means for impelling settlings as sludge substantially horizontally along the bottom of the basin for delivery to said depressed section, and travelling devices comprising horizontally spaced vertically extending members collectively providing a picket-like fence construction operable to disturb the equilibrium of the sludge in said depressed section to form channels in the sludge of lessened resistance to liquid flow by virtue of which liquid is induced to escape upwardly from the sludge into the main body of liquid being clarified whereby there is effected a thickening and concentrating of the sludge in the depressed section of the settling basin and whereby the liquid escaping from sludge being thickened ultimately joins the supernatant effluent from the body of liquid being clarified.

3. Apparatus for treating liquids with suspended solids therein comprising a basin providing a main sedimentation section having a main floor portion and an upstanding marginal wall, a sludge thickening section extending downwardly from the main floor portion and having a lower floor portion and a wall extending between the main floor portion and the lower floor portion, means for feeding incoming liquid in the said basin, means for withdrawing supernatant liquid from said main sedimentation section, mechanism for raking settled sludge from diverse sections of the main floor portion and for transferring the sludge raked thereby to a position from which the conveyed sludge will gravitate to and into the sludge thickening section, and mechanical agitating means provided by spaced parallel thickening elements operable within said lower thickening zone and functioning to cause gentle but positive agitative effects of a character to further the thickening action upon the sludge within the sludge thickening section and while the sludge therein continues to remain in submergence below the main body of liquid undergoing sedimentation in the main sedimentation section, and means for withdrawing thickened sludge from a lower portion of the sludge thickening section.

4. Apparatus for treating liquid as defined in and by claim 3, in which there is a flocculation section, in which the liquid from the flocculation section is delivered immediately over the sludge thickener section, and in which the supernatant liquid passing from the sedimentation zone is withdrawn from a locality substantially spaced from the thickening section.

5. Apparatus for treating liquid as defined in and by claim 3, according to which the sludge thickening section is centrally located with respect to the marginal wall portion of the main sedimentation section and is at a substantially lower elevation than that of the main floor portion of the sedimentation section and according to which the sludge passed from the main floor portion of the sedimentation section is ultimately located within the sludge thickening section whereat it is submerged immediately below the main body of liquid undergoing sedimentation within the main sedimentation section.

ROBERT C. GIBBS.